United States Patent
Lin et al.

(10) Patent No.: US 10,920,746 B2
(45) Date of Patent: Feb. 16, 2021

(54) POWER GENERATING SYSTEM USING CURRENT AROUND STRUCTURAL BODY

(71) Applicant: National Applied Research Laboratories, Taipei (TW)

(72) Inventors: Yung-Bin Lin, Taipei (TW); Kuo-Chun Chang, Taipei (TW); Jihn-Sung Lai, Taipei (TW); Yuan-Shiang Tsai, Taipei (TW); Chi-Heng Chiang, Taipei (TW); Ping-Hsun Huang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 385 days.

(21) Appl. No.: 15/188,161

(22) Filed: Jun. 21, 2016

(65) Prior Publication Data

US 2017/0191463 A1 Jul. 6, 2017

(30) Foreign Application Priority Data

Jan. 5, 2016 (TW) ................................. 105100116

(51) Int. Cl.
*F03D 3/04* (2006.01)
*F03B 17/06* (2006.01)
(Continued)

(52) U.S. Cl.
CPC ................ *F03D 3/04* (2013.01); *F03B 13/12* (2013.01); *F03B 13/264* (2013.01); *F03B 17/06* (2013.01); *F03B 17/061* (2013.01); *F03D 3/002* (2013.01); *F03D 3/005* (2013.01); *F03D 5/06* (2013.01); *F03D 9/008* (2013.01); *F03D 9/25* (2016.05);
(Continued)

(58) Field of Classification Search
CPC ............. F03D 3/04; F03D 5/06; F03B 17/061
See application file for complete search history.

(56) References Cited

U.S. PATENT DOCUMENTS 3,965,679 A * 6/1976 Paradiso ............... F03B 13/184
60/398
4,156,579 A * 5/1979 Weisbrich ................. F03D 1/04
415/2.1
(Continued)

FOREIGN PATENT DOCUMENTS

CN 101000031 A 7/2007
CN 203230524 U 10/2013
(Continued)

*Primary Examiner* — Sean Gugger
(74) *Attorney, Agent, or Firm* — Muncy, Geissler, Olds & Lowe, P.C.

(57) ABSTRACT

The present invention relates to a power generating system utilizing current around a structural body. The power generating system is disposed in a flow field, wherein the streams of the flow field flow along a main fluid flow direction. The power generating system comprises a supporting device and a power generating device. The supporting device comprises a supporting body, wherein at least one of a stream-facing region, a side-stream region, and a vortex region is defined on the supporting body. The power generating device comprises at least one power generating unit and a power storage unit, wherein the power generating unit is disposed in at least one of the stream-facing region, the side-stream region, and the vortex region.

3 Claims, 8 Drawing Sheets

(51) Int. Cl.
*F03D 9/25* (2016.01)
*F03D 9/00* (2016.01)
*F03B 13/26* (2006.01)
*F03B 13/12* (2006.01)
*F03D 3/00* (2006.01)
*F03D 5/06* (2006.01)

(52) U.S. Cl.
CPC ..... *F05B 2220/32* (2013.01); *F05B 2220/706* (2013.01); *F05B 2220/709* (2013.01); *F05B 2240/40* (2013.01); *F05B 2240/911* (2013.01); *F05B 2240/912* (2013.01); *F05B 2240/913* (2013.01); *F05B 2240/97* (2013.01); *F05B 2250/231* (2013.01); *Y02E 10/20* (2013.01); *Y02E 10/72* (2013.01); *Y02E 10/728* (2013.01)

(56) References Cited

U.S. PATENT DOCUMENTS

| | | | |
|---|---|---|---|
| 4,764,683 A | 8/1988 | Coombes | |
| 4,859,866 A | 8/1989 | Horne et al. | |
| 5,520,505 A * | 5/1996 | Weisbrich | F03D 1/04 415/4.1 |
| 5,642,984 A * | 7/1997 | Gorlov | F03B 3/00 416/176 |
| 6,097,104 A * | 8/2000 | Russell | F03D 9/008 290/54 |
| 8,653,684 B2 * | 2/2014 | Baker | F03D 1/04 290/44 |
| 8,931,235 B2 * | 1/2015 | Baker | F03D 1/04 52/745.17 |
| 2008/0093861 A1 * | 4/2008 | Friesth | F03D 1/025 290/55 |
| 2009/0008939 A1 * | 1/2009 | Pare | F03D 1/04 290/44 |
| 2009/0267347 A1 | 10/2009 | Abatemarco | |
| 2010/0034649 A1 * | 2/2010 | Taylor | F03B 17/061 415/208.1 |
| 2010/0117364 A1 * | 5/2010 | Harrigan | B63B 1/048 290/52 |
| 2010/0135768 A1 * | 6/2010 | Pitre | F03B 17/063 415/7 |
| 2011/0006534 A1 | 1/2011 | Achard et al. | |
| 2011/0133462 A1 * | 6/2011 | Pagliasotti | E04F 13/007 290/50 |
| 2011/0133468 A1 * | 6/2011 | Leith | F03D 3/002 290/55 |
| 2012/0099977 A1 * | 4/2012 | Churchill | F03B 17/061 415/185 |
| 2013/0064644 A1 * | 3/2013 | Krietzman | F03D 1/04 415/1 |
| 2013/0216356 A1 * | 8/2013 | Faller | F03D 1/02 415/116 |
| 2013/0236306 A1 * | 9/2013 | Cory | F03D 1/04 416/1 |
| 2013/0313831 A1 * | 11/2013 | Gehring | F03D 13/10 290/54 |
| 2014/0077501 A1 * | 3/2014 | Neifeld | F03B 17/06 290/54 |
| 2015/0260152 A1 * | 9/2015 | Dehlsen | F03B 13/264 416/244 B |
| 2016/0003212 A1 * | 1/2016 | Leonard | F03B 11/02 60/398 |
| 2016/0097371 A1 * | 4/2016 | Lovas | H02K 35/04 290/55 |

FOREIGN PATENT DOCUMENTS

| | | |
|---|---|---|
| CN | 104061111 A | 9/2014 |
| JP | 2002257023 A | 9/2002 |
| JP | 20214151869 A | 8/2014 |
| JP | 2014218911 A | 11/2014 |
| JP | 2015113829 A | 6/2015 |
| TW | 201028539 A | 8/2010 |
| TW | I367990 B | 7/2012 |
| TW | I376453 B | 11/2012 |

* cited by examiner

POWER GENERATING SYSTEM USING CURRENT AROUND STRUCTURAL BODY

CROSS REFERENCE TO RELATED APPLICATION

This application claims the benefits of the Taiwan Patent Application Serial Number 105100116, filed on Jan. 5, 2016, the subject matter of which is incorporated herein by reference.

BACKGROUND OF THE INVENTION

1. Field of the Invention

The present invention relates to a power generating system driven by flows surround a structural body. More specifically, the present invention relates to power generating system driven by the flows generated around the structural body when streams of a flow field flow through the structural body.

2. Description of Related Art

The demands for energy resources increase due to the population explosion as the resources of the earth are gradually exhausted and the global warming is getting more series. In order to solve the above-mentioned problems, scientists strive to discover alternative clean energy resources for replacing the power generating methods utilizing fossil fuels and nuclear energy as their resources. Recently, the applications of solar energy and wind energy are actively discussed and developed. The power generating capacity applying the solar energy and wind energy, however, is unstable due to the effects of climate change and geographical locations.

In comparison, the ocean energy is regarded as a stable renewable energy which is unaffected by time or climate. There are different types of energy in the ocean that are applicable for power generation, such as ocean thermal energy, wave energy, tidal energy, and ocean current energy. For example, ocean thermal energy can be the energy converted from the temperature differences between warm water at the surface layer and cold water at deep in the ocean using the ocean thermal energy conversion power plant disclosed in Taiwan Patent No. TWI367990; wave energy can be the energy converted from the wave motion at the ocean surface using the wave power generator disclosed in China Patent Publication No. CN101000031A; and the tidal energy can be the energy converted from the potential energy between high and low tides using the water turbine disclosed in U.S. Pat. No. 4,859,866. Although the ocean thermal energy is considered as a stable energy source, it is disadvantageous by poor thermal conversion efficiency, deep ocean pipeline constructional inconvenience, and high cost. The potential areas for development of wave energy are limited due to the topography. The wave energy generator is disadvantageous of low energy conversion efficiency, and equipment corruption may be easily caused by the sea water. Furthermore, the tidal energy development is also limited due to the topography, where only the coastal area with large tidal range is suitable for tidal energy development. The tidal energy development is disadvantageous of coastal siltation and equipment corruption.

The ocean current energy, however, is formed by rivers in the ocean affected by the planetary wind system, the Earth's rotation Coriolis force, sea water density differences, and the distribution of lands. Great amounts of sea water regularly flow along a particular direction with steady flow rate, and the flowing path thereof is substantially unchangeable. Accordingly, the ocean current energy is relatively a stable energy source among different kinds of ocean energy, and the power generation principle is converting the kinetic energy of the flowing sea water into electrical energy.

Currently, the power generator utilizes ocean current as the energy source has developed in multiple manners. For example, Taiwan Patent No. TWI376453 disclosed an ocean current-powered generating device capable of facing the fluid flow direction of ocean current, of which the supporting column is disposed under the sea level, and has a power generating unit and a detection unit. The detection unit detects the fluid flow direction of ocean current and drives the supporting column to rotate for keeping the fans of the power generating unit faces the fluid flow direction of ocean current for improving its power generation efficiency.

In addition, China Patent No. CN203230524U disclosed a blocking type vertical ocean energy power generation device, which comprises a frame, a buoy platform, at least three water turbines, at least three power generation modules, and two blocking modules. The water turbines are arranged in the frame in a parallel mode, and the power generation modules are driven by the water turbines.

However, the two power generation device utilizing tidal waves require the constructions for manufacturing large equipment under the sea level and the extra cost of regular maintenance. In fact, there are not many countries have put the tidal wave energy into practice due to the low return on investment.

Therefore, it is desirable to improve the conversion efficiency of the ocean current energy and reduce the cost of manufacturing the ocean current-powered generating device in the field of ocean current power generation.

SUMMARY OF THE INVENTION

The object of the present invention is to provide a power generating system which is disposed in a flow field, wherein streams of the flow field flow along a main fluid flow direction, and the power generating system generates power from fluid flows around a structural body. The power generating system generating system comprises a supporting device and a power generating device, wherein the supporting device includes at least one supporting body. The supporting body has at least one region selected from a stream-facing region, a side-stream region, and a vortex region, wherein the stream-facing region is defined as a surface facing the streams flowing along the main fluid flow direction, the side-stream region is defined as a surface lateral to the streams flowing along the main fluid flow direction, and the vortex region is defined as a surface facing away from the streams flowing along the main fluid flow direction. A down flow is formed in the stream-facing region when the streams flow through the supporting body and contact the stream-facing region; a lateral flow is formed in the side-stream region when the streams flow through the side-stream region, and a vortex flow is formed in the vortex region. The power generating device is disposed on the supporting device, which comprises at least one power generating unit, wherein the power generating unit is disposed in at least one selected from the stream-facing region, the side-stream region, and the vortex region.

In the present invention, the above-mentioned structural body is the supporting device. For example, the supporting device may be a column body, or any one of the support column of the offshore apparatus, onshore apparatus, or apparatus in the river. The supporting device may be the column body with streams flow thereby, such as the foundation of an onshore wind turbine, an offshore wind turbine, an offshore oil drilling station, or an offshore oil storage station, so that the power generating unit disposed thereon may be driven. In the case that the offshore apparatus is an offshore wind turbine, for example, the supporting column of the offshore wind turbine may be a pile type, a tripod type, or tube type serving as a supporting device of the present invention. Alternatively, in the case that the supporting device is an offshore apparatus, the supporting device may be disposed on the seabed using cables while the power generating system is floating in the sea. In addition, the shape of the supporting device is not particularly limited, which can be any one of the shapes of the supporting column in the field, such as a square column, a cylinder column, a triangular column, or a rectangular column.

In one embodiment of the present invention, the power generating unit is selected from a group consisting of a turbine generator and a vibration generator, wherein the installation position thereof is not particular limited. For example, when the power generating units are disposed in the stream-facing region, at least one of the power generating units is the turbine generator which is driven to generate power by the down flow, or at least one of the power generating units is the vibration generator which is driven to generate power by the streams flow in the main fluid flow direction and the down flow. When the power generating units are disposed in the side-stream region, at least one of the power generating units is the turbine generator which is driven to generate power by the lateral flow, or at least one of the power generating units is the vibration generator which is driven to generate power by the lateral flow. Further, when the power generating units are disposed in the vortex region, at least one of the power generating units is the vibration generator which is driven to generate power by the vortex flow behind the supporting body.

In the present invention, the turbine generator may be any type of turbine generator known in the art. A turbine generator, for example, having at least one fan may be applied in the present invention, and the fans of the turbine generator are driven by the fluid flow to rotate and power is generated by transferring the kinetic energy of the rotating fan into electric energy. For example, the turbine generator may be a vertical turbine of a horizontal turbine; the vibration generator may be any one of the vibration generator known in the art, such as an electrostatic type, an electromagnetic induction type, a magnetostrictive type, or a piezoelectric type vibration generator, for transferring the vibration energy into electrical energy.

In the present invention, the above-mentioned power generating units may be disposed at any one of the stream-facing region, the side-stream region, and the vortex region. For example, the power generating unit may be disposed only in the stream-facing region in the case that the power generating unit has more power generating efficiency when disposed in the stream-facing region, or the power generating unit is disposed on the coastal dikes only with the stream-facing region. Alternatively, the power generating units may be selectively disposed in two regions selected from the stream-facing region, the side-stream region, and the vortex region; or may be disposed in three regions simultaneously based on the flow field type or the geographical environment without particular limitation. Further, the number of the power generating units in the same region is not particular limited and can be determined based on the power generating efficiency and the type of the power generating unit.

In another embodiment of the present invention, the supporting device may further comprises at least one tunnel region having a first opening and a second opening and extending through the supporting body, wherein the first opening is disposed in the stream-facing region and the second opening is disposed in the side-stream region or the vortex region so as the streams may flow through the tunnel region, and at least one power generating unit is disposed in the tunnel region. In a preferred embodiment, the power generating unit disposed in the tunnel region may be a turbine generator or a vibration generator.

In a preferred embodiment of the present invention, the supporting device may further comprise a diversion surface formed in the stream-facing region. When the streams contact the diversion surface, the diversion surface diverts the stream into the down flow and guides the down flow to drive the power generating units. The formation of the diversion surface is not particular limited, and may be formed by a shell body extending from the supporting device or formed by a concave portion of the supporting body. For example, the diversion surface may be a concave shell body, but the shape of the shell body is not particularly limited. The diversion surface may gather a large amount of streams so that more streams may be diverted to the down flow in the stream-facing region to drive the power generating unit, and may increase the power generating efficiency.

Also, in a preferred embodiment of the present invention, the power generating device comprises a power storage unit disposed on the supporting body or inside the supporting body and is electrically connected to the power generating unit.

In another preferred embodiment of the present invention, the supporting body may further comprise a diversion trench formed in the side-stream region with the power generating unit disposed therein, the diversion trench is substantially parallel to the main fluid flow direction of the flow field and diverts the streams into the lateral flow and guides the lateral flow to drive the power generating units. The shape of the diversion trench is not particularly limited and can be, for example, an arc shape or a square shape. When the streams flow through the diversion trench, the diversion trench may gather a large amount of the streams which are then diverted to the lateral flow in the side-stream region to drive the power generating units and increase the power generating efficiency of the power generating units that are disposed in the diversion trench. In addition, the number of the diversion trench is not particularly limited; a plurality of the diversion trenches may be formed in the side-stream region of the supporting body with a plurality of power generating units disposed therein.

Furthermore, in the present invention, the flow field may be a wind field, a river current field, or an ocean field. Among the different types of the ocean field, the ocean current flow field is preferable.

The power generating system of the present invention utilizes the down flow, the lateral flow, and the vortex flow as the source of energy that is formed by fluid flows around a structural body, and utilizes the power generating unit for transferring the kinetic energy of the energy sources into electrical energy. Further, the power generating system of the present invention may be incorporated into existing onshore apparatus, offshore apparatus, or apparatus in the river, such as onshore wind turbine, offshore wind turbine, offshore oil drilling station, or offshore oil storage station. The power generating system may improve the efficiency of the power generation from the kinetic energy of the environmental flow field, and by applying the existing apparatus as the supporting device of the power generating system of the present invention may reduce the cost of manufacturing the power generating system.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
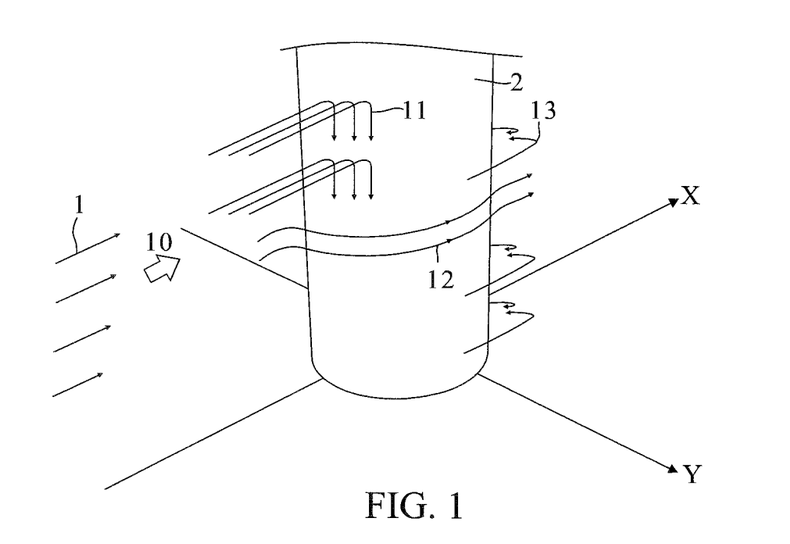
FIG. 1 is a perspective view of different flows generated when the current flow flows through a supporting body.

The down flow, the lateral flow, and the vortex flow generated by the contact of streams and a supporting body are described in the present paragraphs with the supporting column of the offshore wind turbine regarded as the supporting body of the present invention; and the sea current flow regarded as the flow field of the present invention. Please refer to FIG. 1, the supporting body 2 is disposed in the sea where the sea current flow 1 flows through. In the present illustration, when the streams of the sea current flow 1 flow toward the supporting body 2 in a main fluid flow direction and contact the supporting body 2, the streams are forced to flow downward and turn into a down flow 11. A portion of the streams is squeezed by the supporting body 2 and turn into a lateral flow 12 at the surfaces lateral to the main fluid flow direction 10. Further, a portion of the streams flow through the supporting body 2 and turn into a vortex flow 13 due to the disturbance or combination of the streams separated by the supporting body 2. The following embodiment is described with the sea current flow at the example of the flow field.

Figure 2:
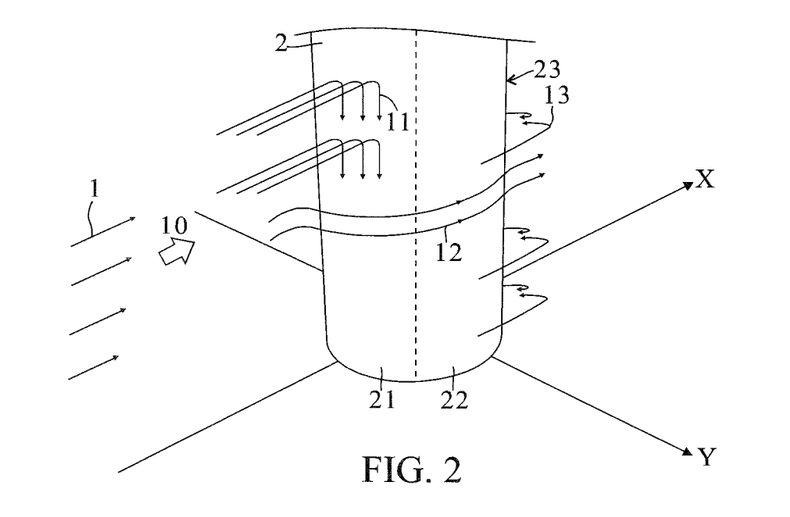
FIG. 2 is a front perspective view of different regions defined on the supporting body of a preferred embodiment of the present invention.
Figure 3:
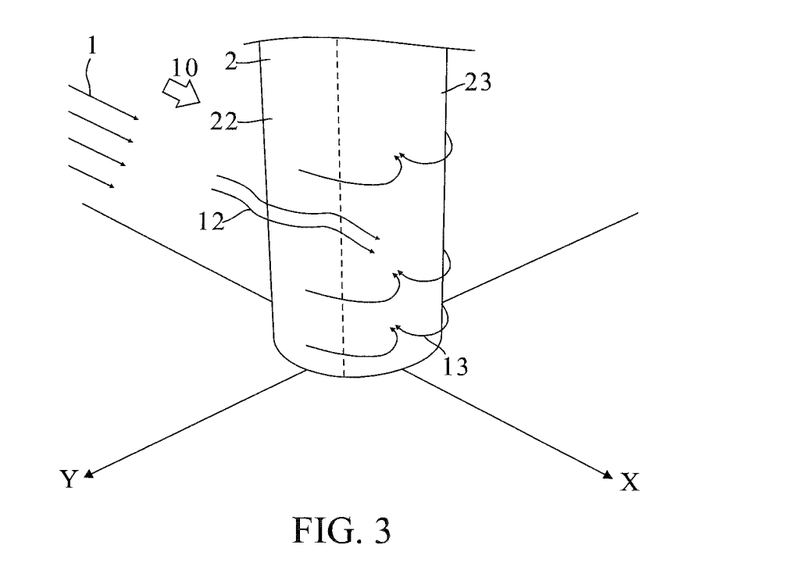
FIG. 3 is a rear perspective view of different regions defined on the supporting body of a preferred embodiment of the present invention.

FIG. 2 is a front perspective view showing a supporting body of the power generating system of the present invention that is disposed in a sea current flow field. A stream-facing region 21, a side-stream region 22, and a vortex region 23 may be defined in different areas of the supporting body 2. Refer to the illustration, when the streams of the sea current flow 1 flow toward the supporting body 2 and contact the stream-facing region 21, the streams are forced to flow downward and turn into a down flow 11; and when the streams 1 flow through the side-stream region 22, the streams 1 are squeezed and turn into a lateral flow 12 in the side-stream region 22. Further, refer to FIG. 3 showing the rear perspective view of the supporting body, when the streams 1 pass through the supporting body 2, the vortex flow 13 is formed in the vortex region due to the disturbance or combination of the streams separated by the supporting body 2.

Figure 4:
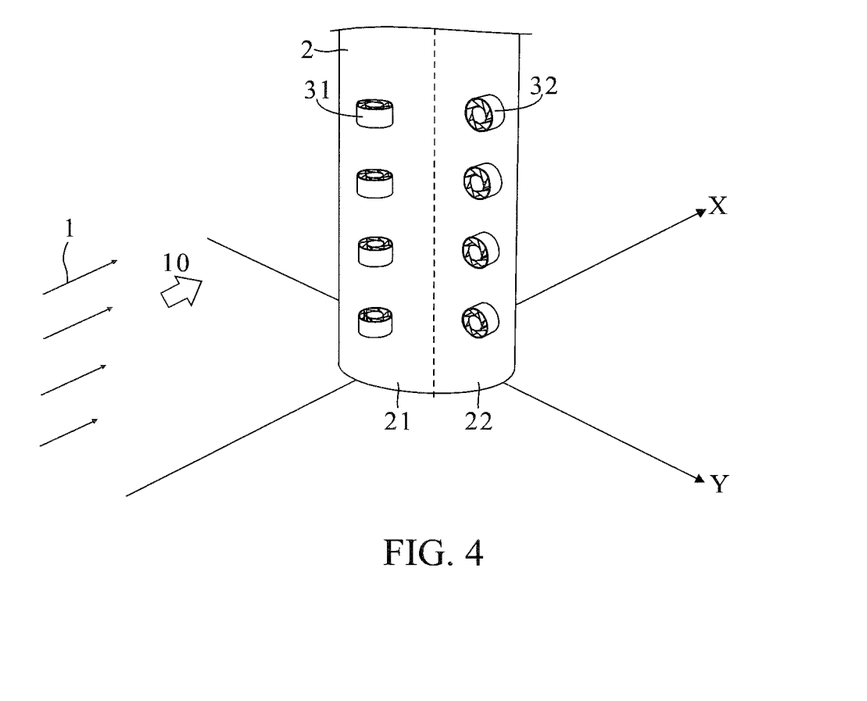
FIG. 4 is a front perspective view showing the arrangement of power generating units of a preferred embodiment of the present invention.
Figure 5A:
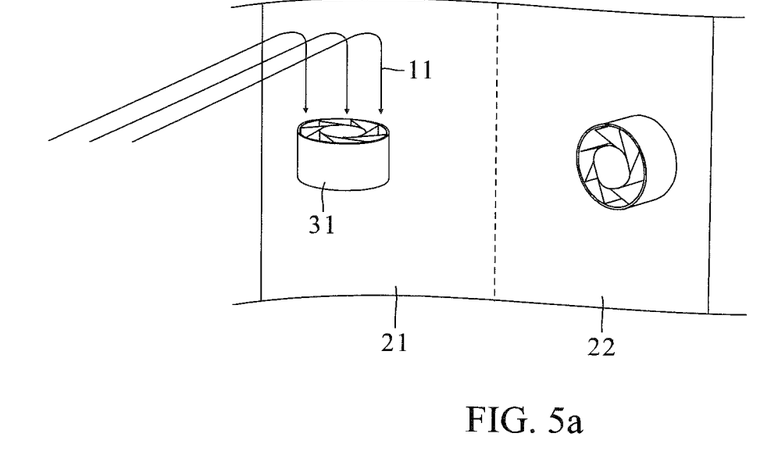
FIG. 5a and FIG. 5b are partial enlargement view of a preferred embodiment of the present invention.
Figure 5B:
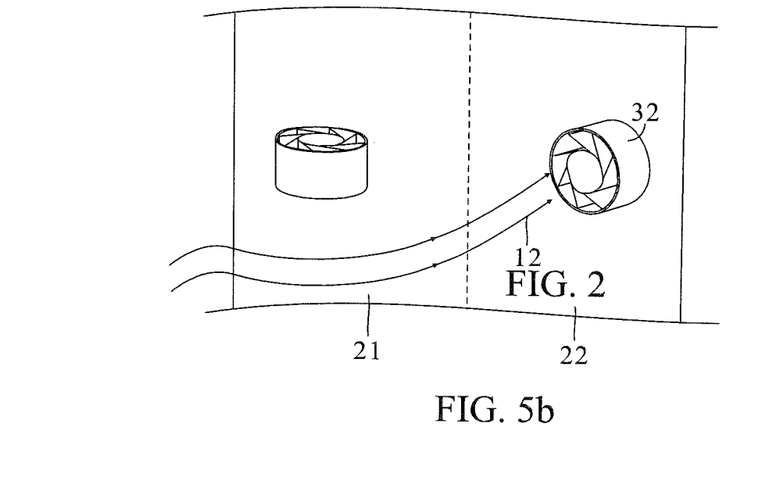

FIG. 4 illustrates the arrangement of the power generating units in the stream-facing region 21 and the side-stream region 22 of the supporting body 2. Please also refer to FIG. 5a, which shows the partial enlargement view of the power generating system illustrated in FIG. 4, a plurality of facing-up turbine generators serving as the power generating units 31 is disposed in the stream-facing region 21, wherein the turbine generators are driven by the down flow and convert the kinetic energy of the down flow 11 to electrical energy. Moreover, please refer to FIG. 5b, which shows another partial enlargement view of the power generating system illustrated in FIG. 4, a plurality of facing-forward turbine generators, which faces toward the lateral flow 12, serving as the power generating units 32 is disposed at the side-stream-facing region 22, wherein the turbine generators are driven by the lateral flow 12 and convert the kinetic energy of the lateral flow 12 to electrical energy.

Figure 6:
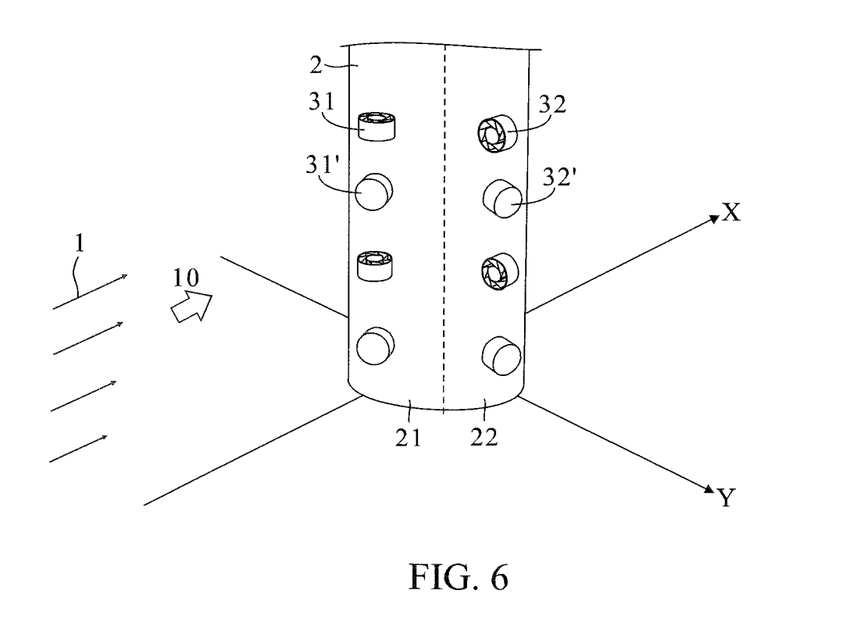
FIG. 6 is a front perspective view showing the arrangement of power generating units of another preferred embodiment of the present invention.

FIG. 6 illustrates the arrangement of power generating units at stream-facing region 21 and the side-stream region 22 of the supporting body 2 of another preferred embodiment of the present invention. FIG. 6 shows the different types of power generating units 31, 31', 32, and 32' disposed alternatively in the stream-facing region 21 and the side-stream region 22 of the supporting body 2, wherein the power generating units 31 and 32 are turbine generators, and the power generating units 31' and 32' are vibration generators.

Figure 7:
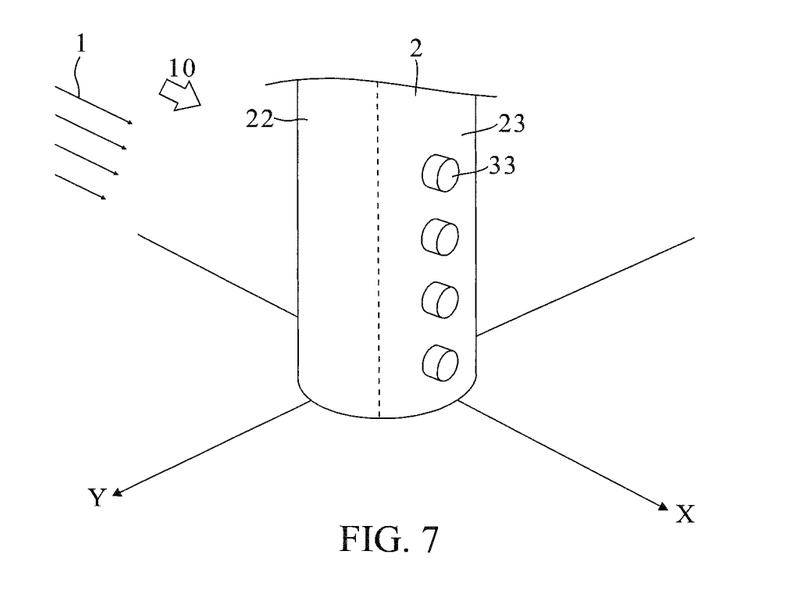
FIG. 7 is a rear perspective view showing the arrangement of power generating unit of a preferred embodiment of the present invention.

FIG. 7 shows the arrangement of power generating units 33 in the vortex region 23 of the supporting body 2. Due to the unstable and unpredictable flowing condition of the vortex flow 13 generated in the vortex region 23 of the supporting body 2, the vibration generators serving as the power generating units 33 are driven by the vortex flow 13 to convert the kinetic energy of the unstable vortex flow 13 into electrical energy.

Figure 8:
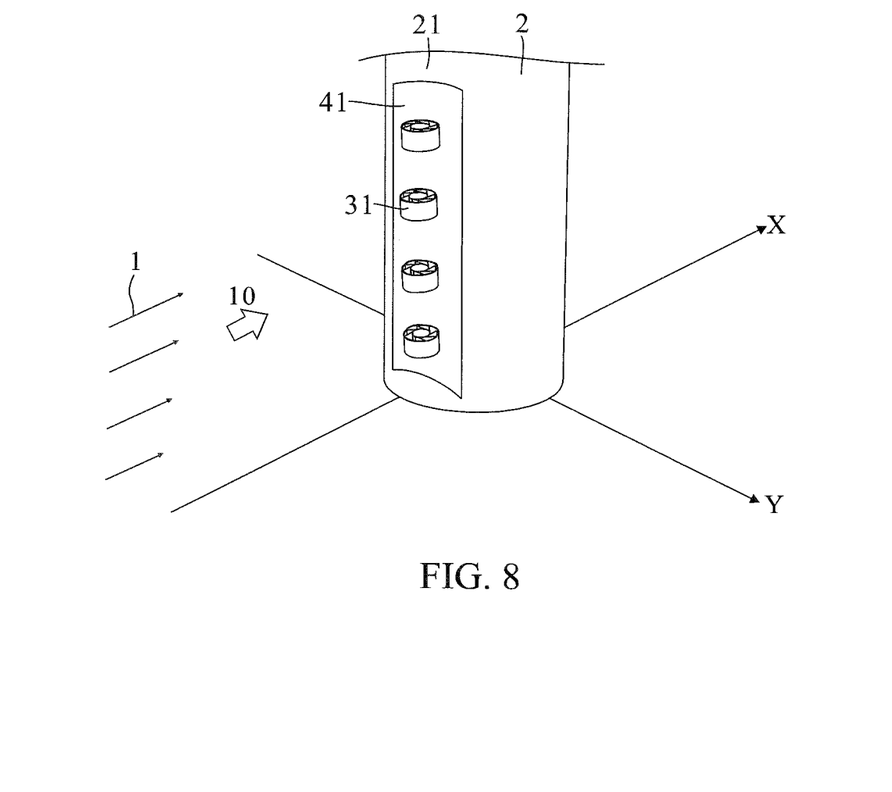
FIG. 8 is a perspective view of the diversion surface of a preferred embodiment of the present invention.
Figure 9:
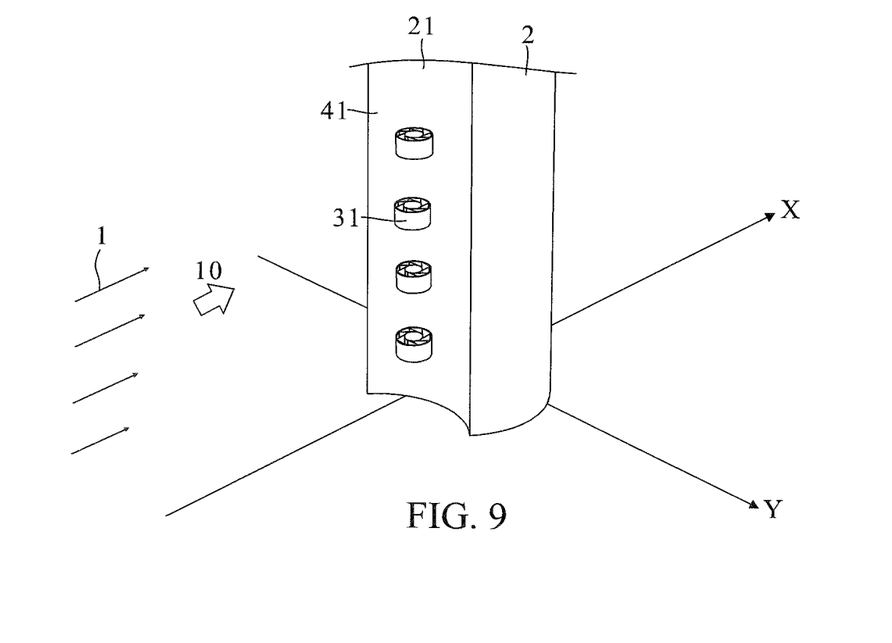
FIG. 9 is a perspective view of the diversion surface of another preferred embodiment of the present invention.

Moreover, in a preferred embodiment of the present invention illustrated in FIG. 8, the supporting device further comprises a diversion surface 41 extending outwardly in the stream-facing region 21, wherein the diversion surface may guide the streams 1 to contact to the stream-facing region and diverts the streams 1 into the down flow 11, the down flow 11 is then guided to flow toward the power generating units 31 for increasing the kinetic energy that drives the power generating units 31 disposed in the stream-facing region 21. Further, in another preferred embodiment, as illustrated in FIG. 9, the diversion surface 41 may be a concave portion of the supporting body 2, which may also guide the streams 1 to contact to the stream-facing region and diverts the streams 1 into the down flow 11 for increasing the kinetic energy that drives the power generating units 31.

Figure 10:
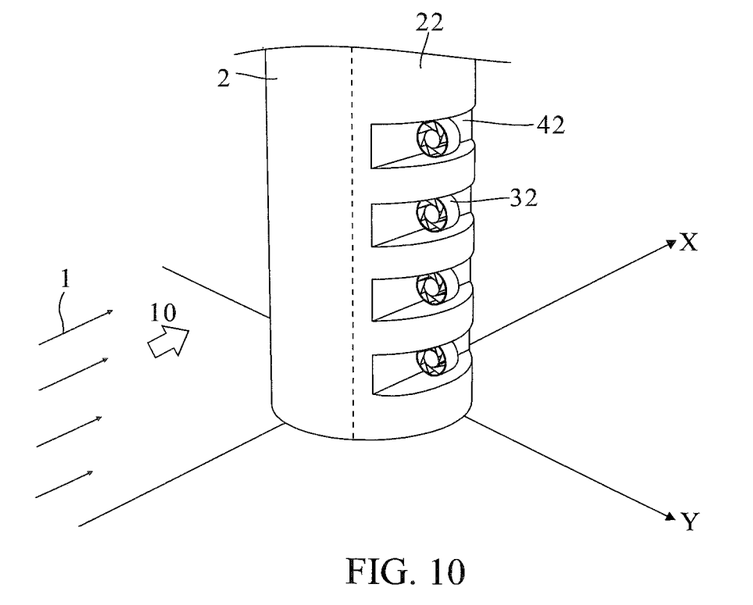
FIG. 10 is a perspective view of the diversion trench of a preferred embodiment of the present invention.

In another preferred embodiment as illustrated in FIG. 10, plurality of diversion trenches 42 may be formed in the side-stream region 22 for increasing the kinetic energy that drives the power generating units disposed in those diversion trenches by converging the lateral flow 12.

Figure 11:
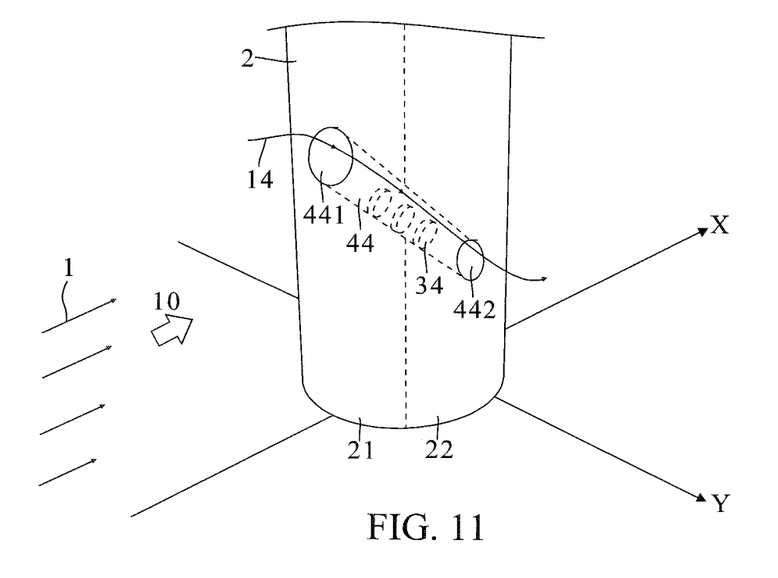
FIG. 11 is a perspective view of the tunnel region of a preferred embodiment of the present invention.

In a preferred embodiment, refer to FIG. 11, the supporting body 2 may further comprise a tunnel region 44, the tunnel region 44 has a first opening 441 and a second opening 442 and extends through the supporting body 1. A plurality of power generating units 34 may be disposed in the tunnel region 44 and be driven by the streams 14 that pass through the tunnel region 44 to generate power.

In the aforementioned embodiments of the present invention, the power storage unit (figure not shown) is connected to those power generating units for storing the generated power. The power storage unit may be disposed on the supporting body or inside the supporting body and may export the power stored in the power storage unit to electrical equipment (figure not shown) by cables (figure not shown). In addition, the supporting bodies demonstrated in the aforementioned embodiments are single supporting column. The supporting body, however, may be varies forms such as fence structure or grid structure constituted by a plurality of supporting bodies as long as the power generating units are configured according to the flowing direction of the streams to achieve the effect of the present invention. Therefore, the structural variation of the supporting body is not particularly limited.

Figure 12:
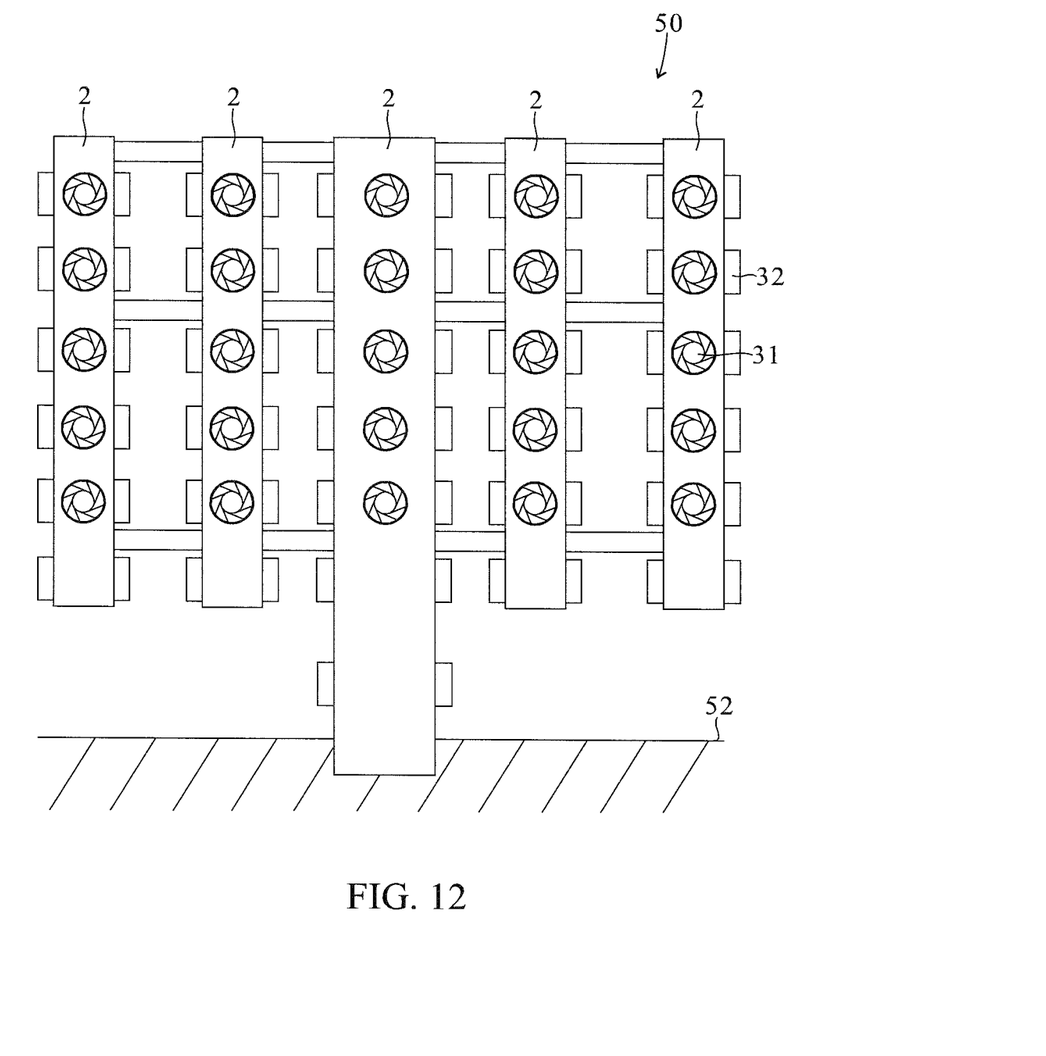
FIG. 12 is a schematic view of the power generating array module disposed on the seabed of a preferred embodiment of the present invention.
Figure 13:
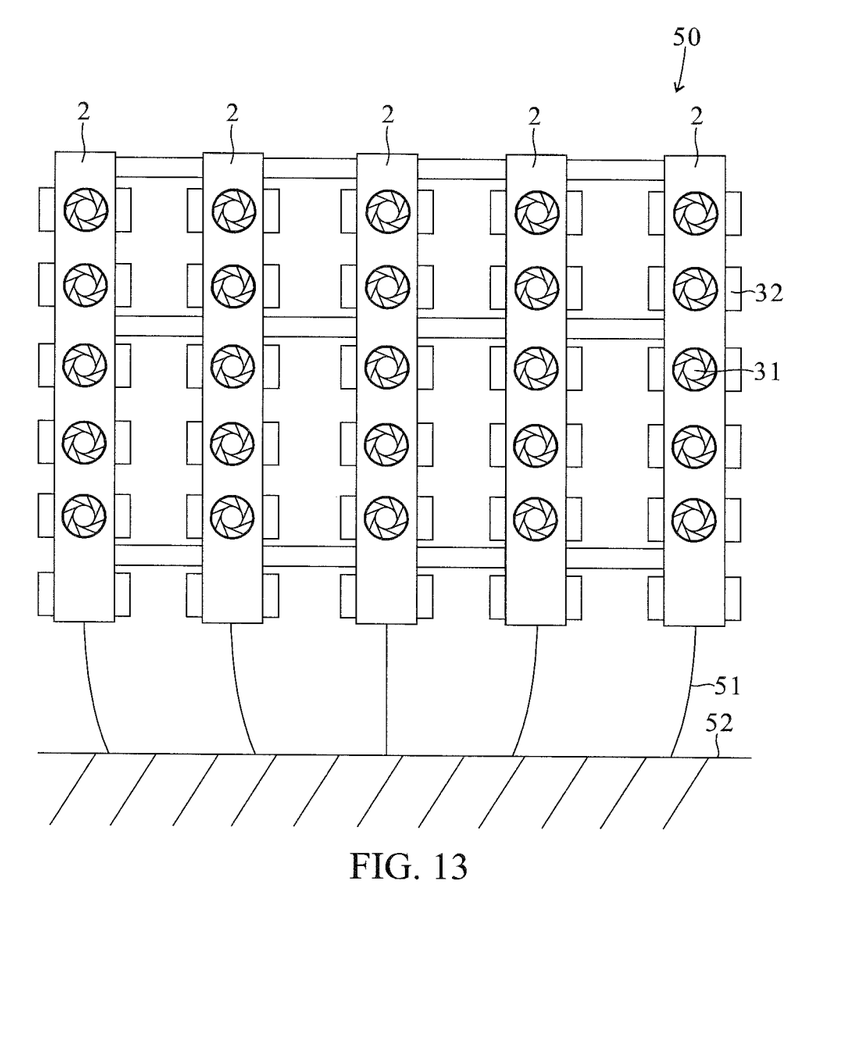
FIG. 13 is a schematic view of the power generating array module disposed on the seabed of another preferred embodiment of the present invention.

Accordingly, a power generating array module may be formed when the supporting device comprises a plurality of supporting body, and the plurality of supporting body is configured as fence structure or grid structure. FIG. 12 illustrates a power generating array module disposed on the seabed, for example, the power generating array module 20 comprises a plurality of supporting body 2, and a plurality of power generating devices disposed on those supporting bodies 2. The power generating units 31, 32 of the power generating device is configured according to the fluid flow direction and may be turbine generator of vibration generator according to the fluid flow direction of the streams described hereinabove. Furthermore, the power generating array module constituted by the power generating devices of the present invention may be built on the seabed 52 as illustrated in FIG. 12, or may be fixed to the seabed 52 by steel cable 51 so that the power generating array module 50 is floating in the sea water.

In summary, the power generating system of the present invention is driven by the flows with different direction, such as the down flow, lateral flow, or vortex flow, generated around the supporting body when streams of the flow field, such as ocean current flow, flow through the supporting body, and converts the kinetic energy of the flows into electrical energy by the power generating units disposed correspondingly on the supporting body. Beyond the sea level, the offshore apparatus having those supporting body, such as offshore wind turbine or offshore oil drilling station, still have their original functions. Hence, the power generating system of the present invention does not need huge constructional cost. However, the application of the present invention is not limited thereto; it is applicable as long as streams of a flow field having kinetic energy flow toward the supporting body and generate local flow changes, such as the supporting column of the onshore apparatus, apparatus in the river, or even the coastal dike facing the impact of the sea current.

Although the present invention has been explained in relation to its preferred embodiment, it is to be understood that many other possible modifications and variations can be made without departing from the spirit and scope of the invention as hereinafter claimed.

What is claimed is:

1. A power generating system being disposed in an ocean field, wherein streams of the flow field flow along a main fluid flow direction, the power generating system comprises:
    a supporting device, including a plurality of supporting bodies having a stream-facing region, a side-stream region, and a vortex region; and at least one tunnel region, wherein the stream-facing region is defined as a surface facing the streams flowing along the main fluid flow direction, the side-stream region is defined as a surface lateral to the streams flowing along the main fluid flow direction, the vortex region is defined as a surface facing away from the streams flowing along the main fluid flow direction, and the at least one tunnel region has a first opening and a second opening and extends through the supporting body, wherein the first opening is disposed in the stream-facing region and the second opening is disposed in the side-stream region or the vortex region so as the streams flow through the tunnel region; a down flow is formed in the stream-facing region when the streams contact the stream-facing region; a lateral flow is formed in the side-stream region when the streams flow through the side-stream region, and a vortex flow is formed in the vortex region; wherein the supporting device is an offshore apparatus having the plurality of supporting bodies configured as a fence structure or a grid structure;
    a power generating device being disposed on the supporting device and comprising a plurality of power generating units, wherein the plurality of power generating units is at least disposed on the stream-facing region and the side-stream region, and selectively disposed on the vortex region;
    a diversion surface formed in the stream-facing region, the diversion surface diverting the stream into the down flow and guiding the down flow to drive said each of the plurality of power generating units which is disposed in the stream-facing region when the streams contact the diversion surface, wherein the diversion surface extends from the supporting device or is formed by a concave portion of the supporting body; and
    a diversion trench being formed in the side-stream region and substantially parallel to the main fluid flow direction of the ocean field, wherein the diversion trench diverts the streams into the lateral flow to increase kinetic energy thereof by converging the lateral flow and to drive each of the plurality of power generating units disposed in the side-stream region;
    wherein said each of the plurality of power generating units is selected from a group consisting of a turbine generator, and a vibration generator, and said each of the plurality of power generating units disposed in the stream-facing region is driven to generate power by the down flow.

2. The power generating system as claimed in claim 1, wherein at least one of the plurality of power generating units is disposed in the vortex region as being the vibration generator driven to generate power by the vortex flow.

3. The power generating system as claimed in claim 1, wherein the power generating device further comprises at least one power storage unit disposed on the supporting body or in the supporting body, and is connected to the plurality of power generating units.

* * * * *